Patented Dec. 2, 1924.

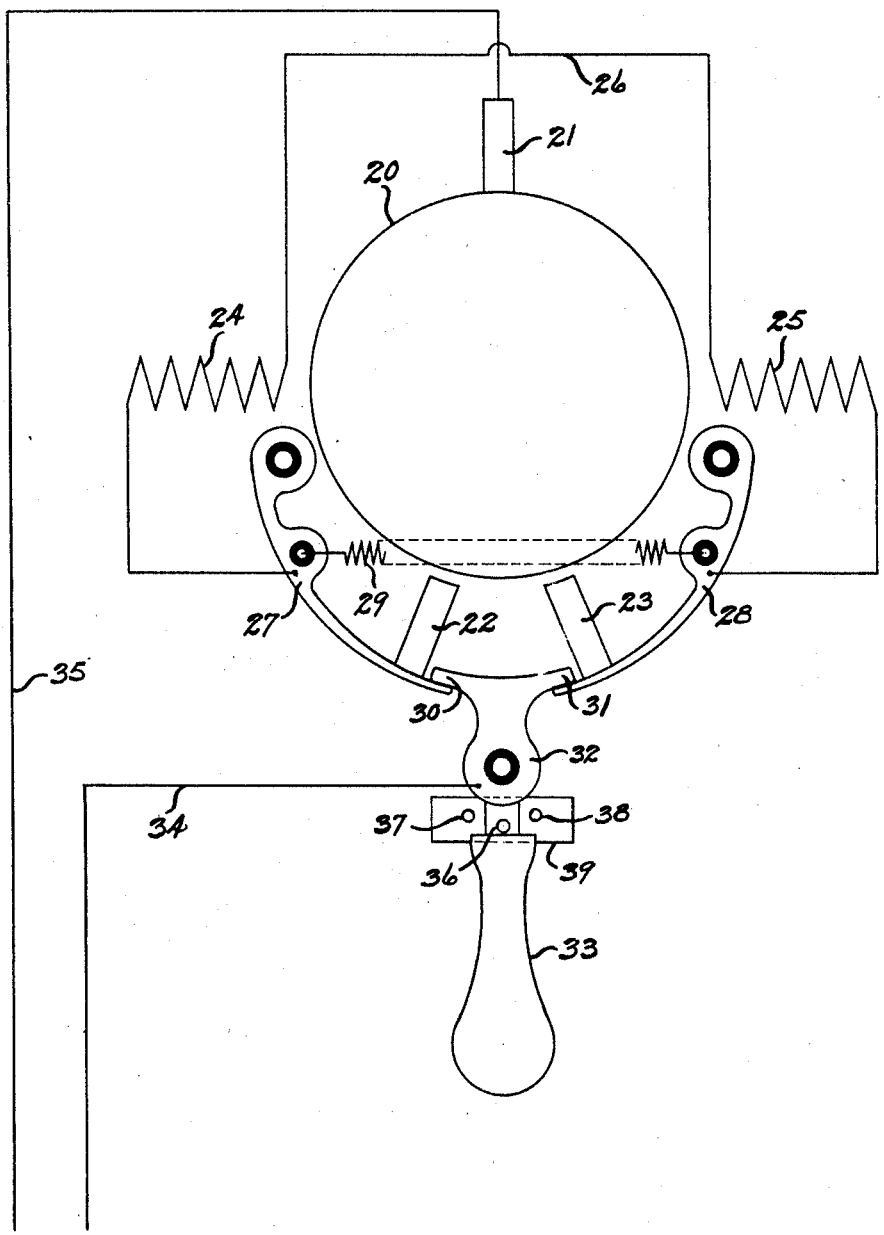

1,518,013

UNITED STATES PATENT OFFICE.

FRANK F. STARR, OF DAYTON, OHIO, ASSIGNOR TO DELCO-LIGHT COMPANY, OF DAYTON, OHIO, A CORPORATION OF DELAWARE.

ELECTRICAL APPARATUS.

Application filed September 26, 1923. Serial No. 664,949.

*To all whom it may concern:*

Be it known that I, FRANK F. STARR, a citizen of the United States of America, residing at Dayton, county of Montgomery, State of Ohio, have invented certain new and useful Improvements in Electrical Apparatus, of which the following is a full, clear, and exact description.

This invention relates to electric motors and has among its objects the provision of apparatus for the control of the motor so as to operate it either by direction or stop by means of controlling apparatus which is more simple in construction than heretofore.

Further objects and advantages of the present invention will be apparent from the following description, reference being had to the accompanying drawing, wherein a preferred form of embodiment of the present invention is clearly shown.

The figure of the drawing is a wiring diagram and shows diagrammatically one form of the present invention.

Referring to the drawing, the motor is represented by a commutator 20 cooperating with brushes 21, 22 and 23, and by a field winding constructed in one or more coils such as 24 and 25 connected together by wire 26 and connected respectively with insulated brush arms 27 and 28 supporting brushes 22 and 23 respectively. The brush arms 27 and 28 are connected by spring 29 for the purpose of maintaining either of the brushes in yielding engagement with the commutator 20. The ends of the spring 29 are insulated from the brush arms 27 and 28. Normally the free ends of brush arms 27 and 28 bear against lugs 30 and 31, respectively, provided on a lever 32 which carries an operating handle 33. The handle 33 is shown in "off" position in the drawings. The lever 32 and the brush 21 are connected with a current source by means of line terminal wires 34 and 35.

When the lever 32 is in the position shown the brushes 22 and 23 are disengaged from the armature and the field windings 24 and 25 are not connected with the current source, therefore the motor will not operate. To produce rotation of the motor in one direction the handle may be turned, for example, clockwise, causing the brush 22 to engage the commutator and projection 30 to be disengaged from the brush arm 27 while the projection 31 is still in engagement with brush arm 28. Current may then flow from the line wire 34 through lever 32, brush arm 28, field coils 25 and 24, brush arm 27, brush 22, commutator 20, brush 21, and back through line wire 35. This will produce rotation of the motor armature in one direction.

In order to effect rotation of the armature in the opposite direction, lever 32 is moved counterclockwise from its normal position, causing the brush 23 to engage the commutator 20 and the projection 31 and lever 32 to be disengaged from the brush arm 28 while the projection 30 still engages the brush arm 27. Therefore, current will flow from the line wire 34 through lever 32, projection 30, brush arm 27, field coils 24 and 25, brush arm 28, brush 23, commutator 20, brush 21 and back to the current source through the line wire 35. Obviously the direction of rotation of the motor will be in the opposite sense because the direction of flow of current through the field windings has been reversed while the direction of current flow through the armature remains unchanged.

The action of spring 29 is to tend to return the lever 32 to normal position, causing the motor to stop. In order to maintain the lever 32 in either of its "on" positions, any suitable retaining device may be provided such as a slidable pin 36 carried by lever 32 adapted to move into either of the holes 37 or 38 provided in a stationary piece 39.

While the form of mechanism herein shown and described constitutes a preferred embodiment of one form of the invention, it is to be understood that other forms might be adopted and various changes and alterations made in the shape, size and proportion of the elements therein without departing from the spirit and scope of the invention.

What is claimed is as follows:

1. An electric motor comprising, in combination, a commutator, a field winding, movable brushes each connected with one end of the field winding, line terminals, another brush for engaging the commutator and connected with one line terminal, and means operable to cause one of the movable brushes to engage the commutator and the other movable brush to be connected with the other line terminal and vice versa.

2. An electric motor comprising, in combination, a commutator, a field winding, movable brushes each connected with one end of the field winding, line terminals, another brush for engaging the commutator and connected with one line terminal, and means operable to cause one of the movable brushes to engage the commutator and the other movable brush to be connected with the other line terminal and vice versa, said means operable also to maintain both movable brushes out of engagement with the commutator.

3. An electric motor comprising, in combination, a commutator, a field winding, movable brush arms each connected with one end of the field winding, line terminals, a brush carried by each brush arm, another brush connected with one line terminal and engaging the commutator, and means connected with the other line terminal and operable to make electrical connection with one of the brush arms and to maintain the brush carried thereby out of engagement with the commutator, while permitting the other movable brush to engage the commutator and its brush arm to be disconnected from said means, and vice versa.

4. An electric motor comprising, in combination, a commutator, line terminals, a brush engaging the commutator and connected with one line terminal, a field winding, pair of movable brush arms, each connected to one end of the field winding, movable brushes each carried by a brush arm and adapted to engage the commutator, spring means tending to move the brushes into engagement with the commutator, and a lever having projections each adapted to engage the brush arms and maintain both brushes out of engagement with the commutator, said lever being operable to maintain one of the brushes out of engagement with the commutator while permitting the other brush to be moved into engagement with the commutator and while making an electrical connection with the other line terminal and the brush arm of the brush which is held out of contact with the commutator, and vice versa.

In testimony whereof I hereto affix my signature.

FRANK F. STARR.